Feb. 1, 1955  A. L. JORDAN  2,700,927
AUTOMOBILE AIR CONDITIONER
Filed Aug. 11, 1949  3 Sheets-Sheet 1
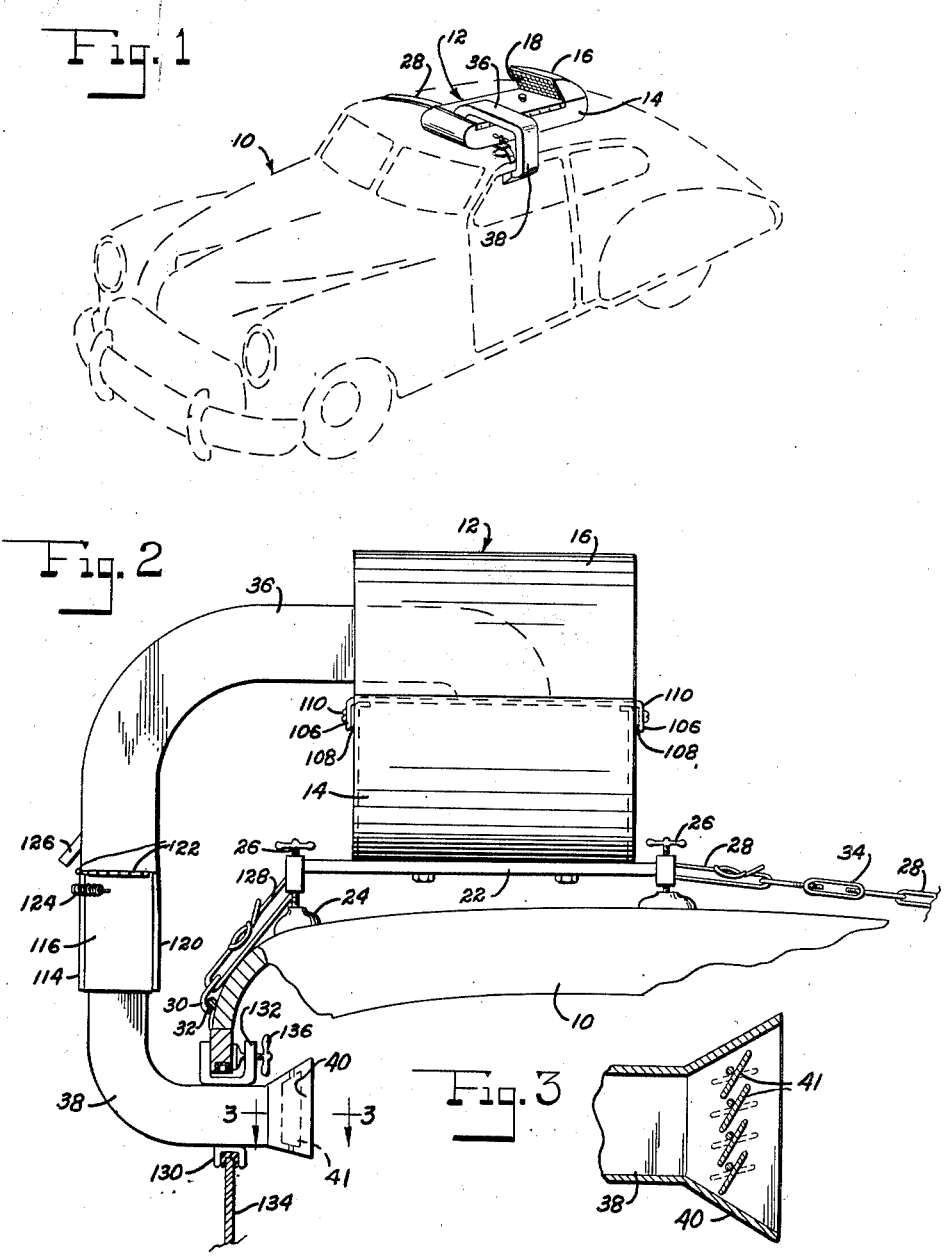
INVENTOR.
Afton L. Jordan
BY
Wayland D. Keith
AGENT Feb. 1, 1955
A. L. JORDAN
2,700,927
AUTOMOBILE AIR CONDITIONER
Filed Aug. 11, 1949
3 Sheets-Sheet 2
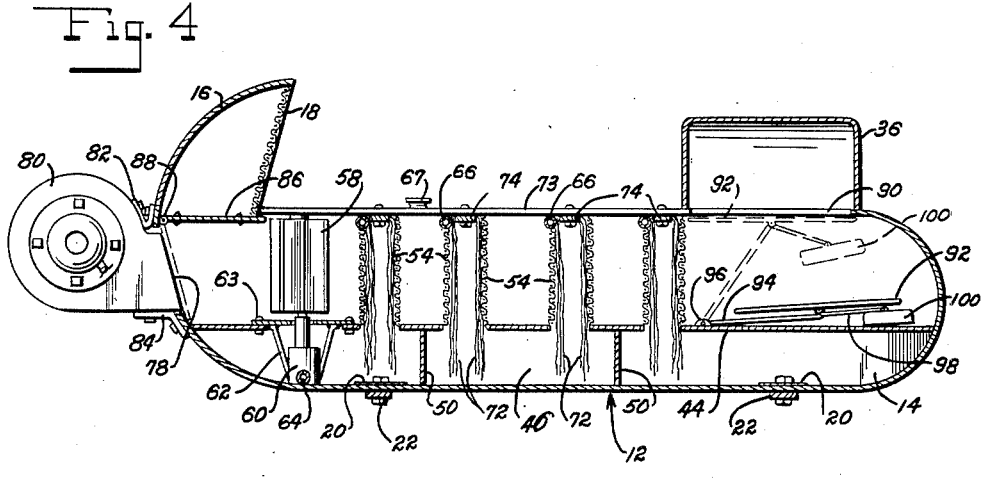
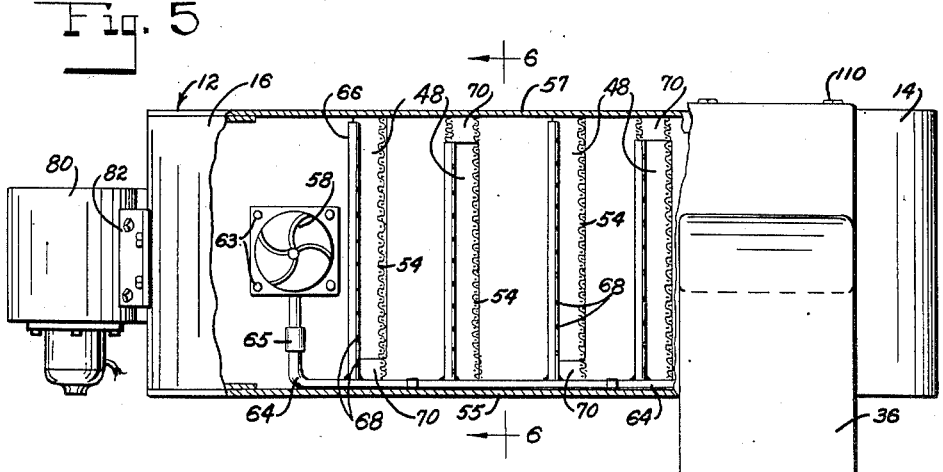
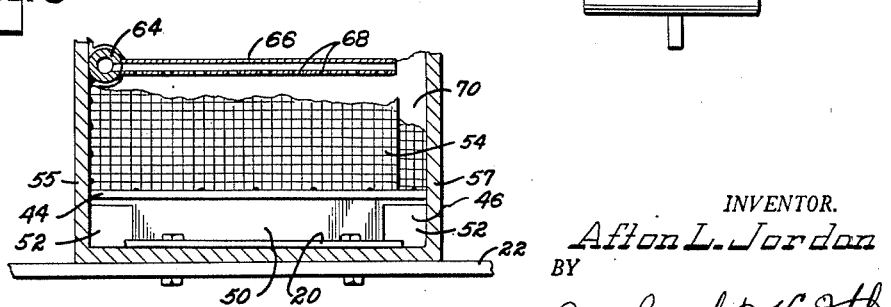
INVENTOR.
Afton L. Jordan
BY
Wayland D. Keith
AGENT

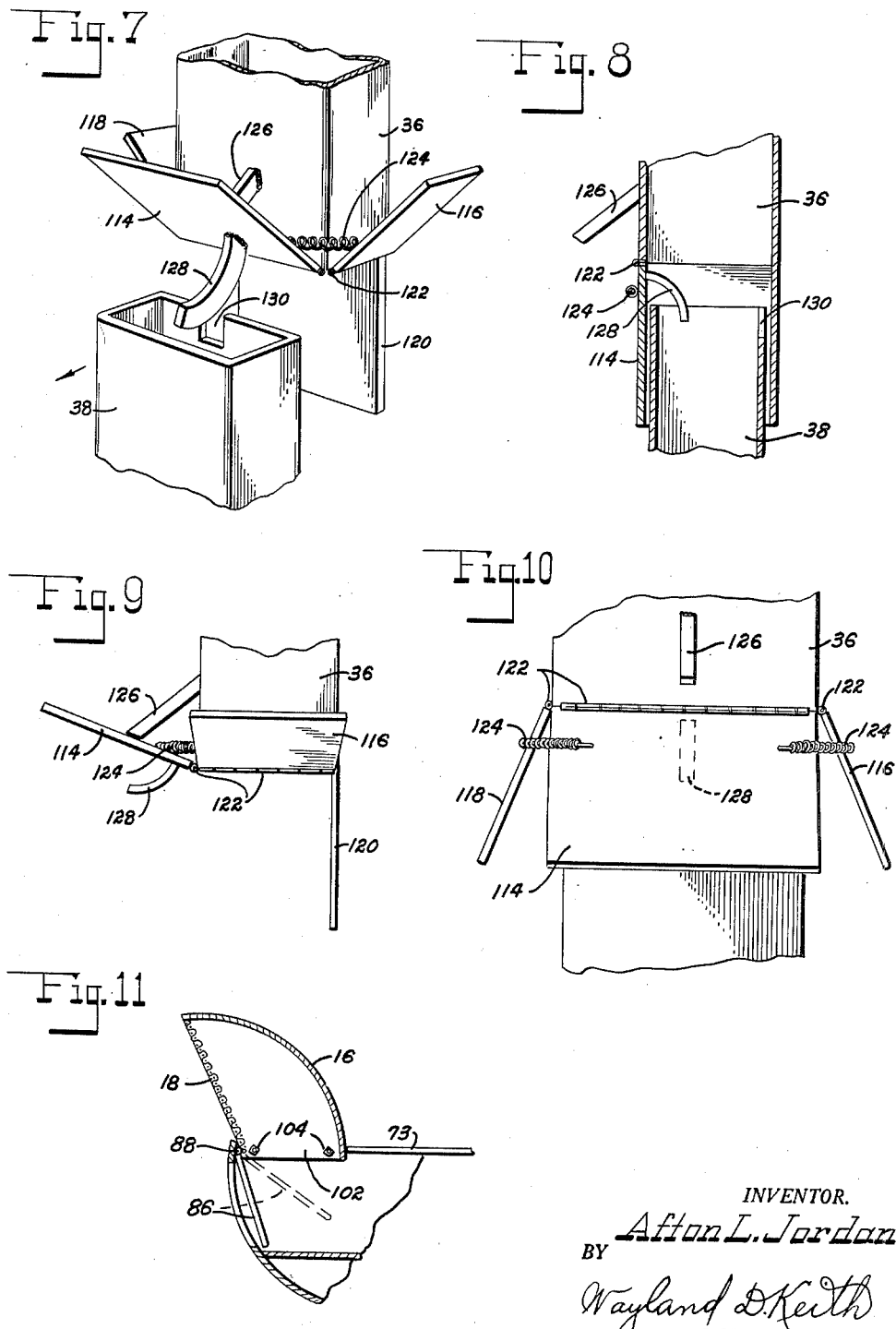

United States Patent Office
2,700,927
Patented Feb. 1, 1955

2,700,927

AUTOMOBILE AIR CONDITIONER

Afton L. Jordan, Wichita Falls, Tex.

Application August 11, 1949, Serial No. 109,749

6 Claims. (Cl. 98—2)

This invention relates to air conditioning equipment, and more particularly to an air conditioning unit of the evaporative type adapted for application to automobiles for cooling the same and maintaining the air at a temperature which will assure the comfort of the occupants.

In the application of air conditioning to automobiles as heretofore practiced, various methods of mounting the equipment on the vehicle have been proposed, which have proven unsatisfactory because of the space which they occupy within the vehicle, or because in attaching such equipment exteriorly of the vehicle it has been necessary to modify the structure of the body, such as by cutting openings therein, or otherwise marring its continuity.

The present invention has for its principal object the provision of air conditioning equipment in the form of a unitary structure adapted to be secured upon the roof of the vehicle, whereby the passenger space inside the vehicle remains unobstructed.

A further object is the provision of unitary air conditioning equipment having means for readily attaching the same in any desired position on the roof of the vehicle, and adjustable to permit its use with any of a wide variety of different sizes and types of vehicles.

Another object of the invention is to provide air conditioning equipment which may be automatically operated without the use of any source of power other than that furnished by the motion of the vehicle, and which is adjustable to permit such operation regardless of the position of the unit on the vehicle.

A further object of the invention is to provide air conditioning equipment for use on automobiles which is simple in design, having few operating parts and of rugged structure capable of withstanding the rough usage and exposure to which such equipment is customarily subjected.

A still further object of the invention is the provision of an air conditioning unit for application to an automobile, which unit is adapted for use without structural changes either with a fan operated from a suitable power source, or by the force of the air created by the motion of the vehicle alone.

Briefly stated, the invention comprises an air conditioner of unitary structure, supported on the roof of a vehicle, adapted to receive outside air and cool the same by addition of moisture thereto, and provided with an adjustable outlet duct whereby the cool air is conducted to the interior of the vehicle through a window opening thereof. An adjustable and releasable connection is also provided in the outlet duct whereby the same may be adjusted for application to vehicles of various sizes and styles and whereby the door through which the duct enters the vehicle may be opened and closed without detaching the duct therefrom.

The above and other objects of the invention will be apparent from the following description constituting a specification of the same when taken in conjunction with the annexed drawings wherein—

Fig. 1 is a perspective view of the invention as applied to an automobile, the latter being indicated in dot-dash-outline;

Fig. 2 is a rear elevational view of the invention showing a portion of the vehicle with the air conditioner installed thereon;

Fig. 3 is a fragmentary horizontal cross-sectional view of the open end of the air duct, showing the arrangement of the louvres therein for directing the cool air entering the vehicle;

Fig. 4 is a longitudinal central cross-sectional view of the invention, showing the interior arrangement of the parts thereof;

Fig. 5 is a top plan view of the invention partly broken away to reveal the interior arrangement thereof;

Fig. 6 is a cross sectional view taken on the line 6—6 of Fig. 5 looking in the direction indicated by the arrows;

Fig. 7 is a fragmentary perspective view showing the connection between the parts of the adjustable air duct from the air conditioner, and how the same is disengaged;

Fig. 8 is a vertical cross-sectional view of the arrangement between the parts of the adjustable air inlet duct of the conditioner in its engaged condition;

Fig. 9 is a fragmentary side elevational view of the air duct leading from the air conditioner, showing the arrangement of the parts of the releasable connection means when the connection is disengaged;

Fig. 10 is a front elevational view of a portion of the air duct leading from the air conditioner, showing the parts of the releasable connection means in partially opened condition; and Fig. 11 is a fragmentary vertical cross-sectional view of a portion of the intake end of the air conditioner, showing the manner in which the intake is mounted thereon and how the same may be adjusted.

Referring to the drawings in greater detail the air conditioning unit of the invention is shown in Fig. 1 as the same is mounted on an automobile, indicated generally by 10. The air conditioning unit 12 is preferably positioned on the roof of the automobile, and comprises a somewhat elongated casing 14, having at one end an upwardly extending portion 16 providing an opening 18 through which air may enter the unit. The opening 18 is preferably covered with a screen of suitable mesh, to exclude debris, insects, and the like from the equipment.

The casing 12 is preferably formed with rounded ends, and flat top and bottom surfaces, and may be conveniently mounted in position on the roof of the vehicle in the manner and by the means shown in Fig. 2.

Within the bottom of the casing reinforcing plates 20 may be positioned, at suitable locations, serving to assure secure attachment of transverse members 22 on the bottom of the casing, by means of bolts or the like. The transverse members 22 carry, adjacent their opposite ends, suction cup devices 24 provided with adjusting screws 26, whereby, the casing can be adjusted in position on the roof of the vehicle. The transverse members 22 also carry straps 28, provided with hooks 30 for engagement with the gutter strips 32 at opposite sides of the roof of the vehicle, whereby the casing is securely maintained in position. The straps 28 are adjustable by means of conventional buckles or the like, and a turnbuckle 34 may be positioned in one of the straps, to provide means whereby the same may be more tightly adjusted when desirable.

At the opposite end of the casing from the intake 16 an outlet duct 36 is secured, as best seen in Figs. 1 and 2, this duct extending laterally beyond one side of casing, and downwardly adjacent a side of the vehicle. At its lower end the duct 36 is fitted with a telescoping section 38, in the form of an elbow, extending through a window opening of the vehicle for admitting air to the interior of the vehicle. The open end of the elbow 38 is preferably flared outwardly, as indicated at 40, within which flared portion adjustable louvres 41 may be provided for directing the incoming current of cooled air in any desired direction within the vehicle.

Within the casing 12 a horizontal partition 44 is spaced above the bottom thereof to form a water chamber 46 extending from end to end of the casing, for the full width of the same. The space above the partition 44 between the same and the top of the casing forms an air chamber wherein air passing through the conditioner is cooled. The partition 44 has openings 48 at suitably spaced intervals extending transversely of the casing to permit air moistening devices positioned above the partition to have access to the water chamber.

Beneath the partition 44 transversely extending vertical baffles 50 are provided at spaced intervals to prevent sudden surging of the water from one end of the casing to the other upon starting or stopping of the vehicle, or when the casing assumes a sloping position. Openings 52 are formed in the baffles 50 to permit the passage of water therethrough, in order to allow the water in the water chamber to assume a constant level therein.

At opposite sides of the openings 48 in the partition 44 screen-like members 54 extend upwardly and laterally of the casing, for the purpose of confining water absorbing material between these members above the openings.

Above the partition 44 near the inlet end of the casing an impeller 58 is positioned to be acted upon by air entering the intake 16 and passing downwardly and horizontally through the casing above the partition. The impeller is journaled in a bearing attached to the top of the casing, and is operatively attached to a water pump 60 at its lower end, which pump is positioned beneath the partition 44 inside the water chamber. The water pump 60 may be of any conventional design, supported on a bracket 62 attached to the partition 44 through which the lower end of the impeller extends for operative connection with the pump. The outlet of the pump 60 has a tube 64 attached thereto, which tube extends longitudinally of the casing along one side thereof adjacent the top. Branch tubes 66 are attached to the tube 64 extending transversely of the casing adjacent the top, along the screen-like members 54, which are positioned at the side of the openings 48 toward the inlet end of the casing. These branch tubes 66 are provided with perforations 68 throughout their length, to permit the distribution of water evenly over the water absorbing material confined between the members 54. Upon operation of the impeller 58, the pump 60 takes water from the water chamber and forces the same through the tube 64 into the branch tubes 66, whence the water passes out of the openings 68 to be distributed over the water absorbing material above the partition 44 to cool the air passing through the casing.

As will be seen from an inspection of Fig. 5, the screen-like members 54 engage one side 55 of the casing, and terminate short of the opposite side 57 thereof, to form openings 70 extending from the partition 44 to the top of the casing. The openings 70 are arranged alternately at opposite sides of the casing to form a tortuous passage about the sections of water absorbing material from one end of the casing to the other, whereby the flow of air through the casing may be somewhat accelerated without unduly sacrificing the cooling of the same by contact with the water absorbing material.

The water absorbing material may take the form of wicking, string, or the like, 72 passing over transverse plates 74 secured to the top 73 of the casing, and extending downwardly between the screen-like members 54 through the opening 48 into the water chamber 46. In this form, the absorbing material takes up water from the water chamber after the manner of a wick, as well as receiving water from the branch tubes 66, thus assuring complete wetting of the water absorbing material, and an even distribution of the moisture to the air passing through the same.

Alternatively, other forms of water absorbing material may be employed, such as excelsior for example, which may be placed in suitable open-mesh fabric to form bats of convenient size and compactness to be positioned between the screen-like members 54 above the openings 48.

In the case of the use of a material such as excelsior for the water absorbing medium, it is unnecessary that the same extend below the partition 44 into the water chamber, since such material does not possess the wicking property of string or similar material, and need not, therefore, be wetted at the bottom, but will be sufficiently saturated with moisture from the branch tubes 66.

At the intake end of the casing an opening 78 may be provided over which a blower 80, of any suitable type, may be attached in order to force air through the casing and into the vehicle when the same is not in motion or where it is desired to operate the unit without providing an air intake operating as does the intake 16. The blower 80 may be secured to the casing in any suitable manner, as by means of the brackets 82 and 84.

Within the casing beneath the intake 16 a hinged member 86 is positioned for movement about a horizontal pivot 88, which member is adapted to close the opening 78 when in down position, when the blower 80 is not in use. In the event that the blower 80 is to be used, the force of air entering the casing through the opening 78 will maintain the member 86 in its upmost position closing the intake 16 and preventing the exhaust of air from the blower through the intake.

At the outlet end of the casing 14 an opening 90 in the top thereof, is provided to permit the air to pass into the duct 36. A closure 92 is provided for the opening 90, as best seen in Fig. 4, which closure is attached to a pivoted arm 94 hinged to the partition 44 at 96. A float arm 98 is attached to the closure 92 where the same is connected to the arm 94, and a float 100 is attached to the outer end of float arm 98. In event that the casing is tilted, by reason of the vehicle being moved along a slope, or if for some other reason the water in the casing should move to the outlet end of the same, the float 100 will be raised, resulting in closing the opening 90 by the closure 92, thus preventing the escape of water through the duct 36 into the interior of the vehicle. Upon subsidence of the water in the casing, the float 100 will again fall, and the closure will move downwardly away from opening 90, permitting unobstructed movement of air from the casing through the duct.

The intake portion 16 of the casing may have its sides 102 extending through the top of the casing and secured thereto by bolts 104, to permit said intake portion to be removed from the casing, reversed, and again attached thereto, in the event it should be desired to reverse the position of the casing on the vehicle. In this manner the flow of air through the casing may be accomplished, in the event it should become necessary to reverse the position of the same to permit the duct 36 to be used with any desired window of the vehicle.

As best seen in Figs. 2 and 4, the top 73 of the casing has its opposite sides formed with downturned portions 106, beneath which suitable gasket material 108 is applied to form an air tight fit between the sides 55 and 57 of the casing and the downward turned portions of the top, when the top is secured in position by suitable fastenings, such as screws 110.

The air conditioning unit, as seen in Fig. 1 may be applied to vehicles where it is possible to keep the door through which the cooled air enters the vehicle closed during the time that air conditioning is to be used. When, however, it is inconvenient to keep a door of the vehicle permanently closed during the season when air conditioning is to be used, then the arrangement illustrated in Figs. 2, 7, 8, 9, and 10 may be employed to make it possible to apply the air conditioning unit without interfering with the operation of the door.

For this purpose, the duct 36 has its lower end provided with hinged portions 114, 116 and 118, located on three sides of the duct, while the fourth or rear side of the duct 120 remains continuous. The hinged portions 114, 116 and 118 are attached by horizontal hinges, such as 122, and are retained in closed position about the upper end of the elbow 38 by spring members 124 or the like. The spring members 124 are attached at their opposite ends to adjacent hinged portions and extend about the corners of the duct formed by these portions.

It will be seen by an examination of Fig. 7, that when the elbow 38, which is positioned in a window of the vehicle is moved outwardly from the rear wall 120 of the duct 36, the hinged portion 114 will be forced outwardly and will swing upwardly. Upon outward movement of the hinged portion 114 the spring members 124 are subjected to tension, and as the portion 114 is elevated these spring members move upwardly along the corners of the duct 36, until they reach a position at which an upward pull is exerted on the hinged portions 116 and 118 at the side of the duct. In this manner, the side hinged portions 116 and 118 will be raised with the hinged portion 114, when the elbow 38 is moved outwardly from the rear wall 120, upon opening movement of the door of the vehicle.

A stop member 126, attached to the outer wall of the duct 36, engages the hinged portion 114 to prevent the same from moving upwardly too far. Due to the tensioning of the spring member 124, the hinged portions of the duct 36 will remain in their upmost positions when the elbow 38 has been moved outwardly from the duct.

A projection 128 is attached to the inner face of the hinge portion 114, which is engaged by the elbow 38, upon movement of the same inwardly toward the rear wall 120 of the duct, during a closing movement of the door of the vehicle. A slot 130 is provided in the rear wall of the elbow 38, through which the projection 128 passes upon closing movement of the door, to permit the elbow 38 to move inwardly without interfering with the hinge portion 114 until the outer wall of the elbow engages the projection 128. As soon as the outer wall of the elbow engages the projection 128, the hinged portion 114 will be moved downwardly, tensioning the spring members 124, and moving the same downwardly along the corners of the duct until the hinged portion 114 is closed and the hinged portions 116 and 118 are also moved to their closed positions. It will thus be seen that the upper end of the elbow 38 is telescopically enclosed within the lower end of the duct 36, and may be adjusted up or down to suit the particular conditions and to permit the elbow to be inserted through any desired window opening of the vehicle. In the event that the door of the vehicle through which the elbow 38 passes should be opened for any reason, the elbow will be detached from the duct 36 in the manner described above, and the door may thus be used for its normal purposes.

The elbow 38 may conveniently be provided with U-shaped members 131 and 132 attached thereto at the region where the elbow passes through the window opening of the vehicle. The member 131 receives the upper edge of the window glass 134, while the member 132 may be provided with screws such as 136, forming a clamp for engagement with the margin of the window opening, whereby the elbow is securely retained in position in the opening.

As seen in Figs. 4 and 5, the pump 60 is supported on the brackets 62 conveniently secured by bolts or other suitable fastening means 63 to the partition 44. By removing bolts 63, after the top 73 of the casing has been taken off, the impeller 58 and the entire pump may be removed from the casing by detaching the connection 65 in the pump outlet tube 64. In this manner the entire pump and impeller mechanism may be removed from the air conditioning unit for purposes of replacement and repair, without otherwise disassembling the air conditioner structure.

When the water absorbing means employed is in the form of wicking or string 72, these are secured to the top of the casing, as previously described, so that when the top of the casing is removed the water absorbing material is removed from between the screen-like members 64 at the same time.

Water is applied in the water chamber 46 to any convenient depth, such that the same may be absorbed by the water absorbing medium, and distributed by the pump 60 through the tube 64 and branch tubes 66 to maintain the water absorbing medium in a saturated condition. The movement of air through the intake 16 into the casing causes rotation of the impeller 58, and thus operates the water pump 60. The incoming air then passes through and about the water absorbing medium positioned between the screen-like members 54 above the opening 48, and is cooled by taking up moisture therefrom. The air thus cooled is conducted to the interior of the vehicle through the duct 36 and elbow 38. The water supply may be replenished by introducing water from a hose or other convenient source, through the screen 18 into the intake 16, so that the water runs down inside the casing into the water chamber. A filling opening provided with a suitable closure 67 may also be provided in the top of the casing.

It will be apparent that the invention as described above provides an air conditioning unit capable of application to the roof of a vehicle in position for admitting air to any desired window opening of the same, whereby a single type of unit can be employed with a very wide variety of different types of vehicles with equally satisfactory results.

While the invention has been described in connection with a particular structure and application of the same, it will be understood that numerous changes can be made in the construction and arrangement of the various parts, the materials employed, and the particular manner in which the device is applied, without departing from the spirit of the invention and within the scope of the appended claims.

Having thus clearly shown and described the invention, what is claimed and desired to secure by Letters Patent is:

1. An air conditioning device for vehicles comprising a casing adapted to be positioned on the roof of a vehicle, an opening formed in said casing, a horizontal partition in said casing defining a water chamber therein, and an air passage in said casing above said water chamber, a hollow, reversible, upstanding neck portion in said opening forming an inlet in said casing so as to be in communication with said air passage and directed toward the front of said vehicle, said partition having an opening formed therein between said air passage and said water chamber, water absorbing means in said air passage extending through said opening, an outlet opening formed in said casing remote from said inlet and in communication with said air passage, and duct means extending through a window of said vehicle and connected to said outlet for conveying air from said casing to the interior of said vehicle.

2. An air conditioning device for vehicles comprising a casing adapted to be positioned on the roof of a vehicle, an opening formed in said casing, a horizontal partition in said casing defining a water chamber therein and an air passage above said water chamber, a hollow reversible, upstanding neck portion mounted in the opening of said casing and forming an inlet into said casing, means attachably securing said neck portion in said opening for directing air into said casing above said partition, said partition having spaced openings formed therein, a plurality of water absorbing means in said air passage extending through said openings, each of said water absorbing means extending vertically from the top of said casing to said partition and laterally from a side of said casing to a point spaced from the opposite side thereof, an outlet opening formed in said casing communicating with said air passage at a point remote from said inlet, and duct means extending through a window of said vehicle and connected to said outlet for conveying air from said casing to the interior of said vehicle.

3. In an air conditioning device for a vehicle having a roof and doors, a casing adapted to be positioned on the roof of said vehicle, a water chamber formed in the lower portion of said casing, an air passage formed in said casing above said water chamber, strips of absorbent material suspended from the upper portion of said casing and extending downward through said air passage into said water chamber, an air inlet formed in said casing in communication with one end of said air passage, an air outlet formed in said casing and in communication with another end of said air passage, and duct means for conveying said cooled air from said casing to the interior of said vehicle comprising two sections, a stationary section mounted on the roof of said vehicle and a duct section mounted on said door and movable therewith and adapted to register with said stationary section when in one position.

4. In an air conditioning device for a vehicle having a roof and doors, a casing adapted to be positioned on the roof of said vehicle, a water chamber formed in the lower portion of said casing, an air passage formed in said casing above said water chamber, strips of absorbent material suspended from the upper portion of said casing and extending downward through said air passage into said water chamber, an air inlet formed in said casing in communication with one end of said air passage, an air outlet formed in said casing and in communication with another end of said air passage, means for conveying air through said casing for humidifying and cooling said air by contact with said absorbent material, duct means for conveying said cooled air from said casing to the interior of said vehicle, said duct comprising two sections, a stationary section mounted on the roof of said vehicle and a section mounted on said door and movable therewith and adapted to register with said stationary section when in one position, a portion of one of said duct sections having a wall section hinged thereon and movable for closing and opening with respect thereto upon the closing and opening of said door, resilient means for maintaining said wall section in a normally closed position or in a normally open position, and trigger means mounted on said movable wall section for engagement with the other of said duct sections so when said duct sections are moved substantially into register said hinged wall section will close, and when the other of said duct sections is moved out of register therewith, said hinged wall section will open.

5. An air conditioning device for a vehicle having a window therein and an imperforate roof, comprising a flat bottom casing adapted to be positioned on an imperforate roof of said vehicle, a water chamber formed in said casing, an air passage formed in said casing above said water chamber, a sheet of metal having perforations formed therein separating said air passage and said water chamber, absorbent material secured in said water chamber and extending upward into said air passage to provide evaporative communication between the water in said water chamber and air in said air passage for humdifying and cooling said air passing through said air passage, an air inlet formed in said casing for directing air thereinto, said air inlet being in communication with said air passage, an air outlet formed in said casing in communication with said air passage, a duct leading from said air outlet passage to an opening formed by lowering a window in said vehicle for directing air from said casing into said vehicle, and a closure means positioned adjacent said air outlet passage in said casing and having means attached thereto for urging said closure into a closed relation with said air outlet opening upon movement of water in said water chamber toward said air outlet passage so as to close said air outlet passage.

6. In an air conditioning device for a vehicle having a roof and a door, a casing adapted to be positioned on the roof of said vehicle, a water chamber formed in said casing for maintaining water therein, upstanding transverse baffles mounted within said casing and extending to the bottom of said water chamber, each of said baffles having a restricted opening formed in the lower portion thereof, an air passage formed in said casing above said water chamber, absorbent material positioned within said air passage of said casing, means for supplying water onto said absorbent material in said air passage so as to maintain the surfaces thereof wetted, an air inlet formed in said casing in communication with said air passage, an air outlet formed in said casing and in communication with said air passage at the end remote from the inlet of said casing, an air discharge conduit leading from the outlet of said casing, an opening formed through the door of said vehicle, said air discharge conduit being connected with said opening in said door for discharging air into said vehicle, closure means in said air discharge conduit, float means in said water chamber for operating said closure means to close said air discharge conduit upon the raising of the water level in said casing, and means for passing air through said casing and into said vehicle.

References Cited in the file of this patent

UNITED STATES PATENTS

| Number | Name | Date |
|---|---|---|
| 391,324 | Lindsey | Oct. 16, 1888 |
| 980,471 | Zenke | Jan. 3, 1911 |
| 1,748,282 | Ellis | Feb. 25, 1930 |
| 1,990,753 | Rapp | Feb. 12, 1935 |
| 2,182,569 | Peo | Dec. 5, 1939 |
| 2,184,833 | Dewey | Dec. 26, 1939 |
| 2,232,108 | Giacomini | Feb. 18, 1941 |
| 2,257,639 | Moore | Sept. 30, 1941 |
| 2,285,725 | Kneedler | June 9, 1942 |
| 2,435,798 | Rice et al. | Feb. 10, 1948 |
| 2,500,527 | Demuth | Mar. 14, 1950 |
| 2,516,103 | Brown | July 25, 1950 |